US012523070B2

(12) United States Patent
Kondo

(10) Patent No.: US 12,523,070 B2
(45) Date of Patent: Jan. 13, 2026

(54) LOCK APPARATUS FOR LID OF BOX

(71) Applicant: NIFCO INC., Yokosuka (JP)

(72) Inventor: Koji Kondo, Yokosuka (JP)

(73) Assignee: NIFCO INC., Yokosuka (JP)

(*) Notice: Subject to any disclaimer, the term of this patent is extended or adjusted under 35 U.S.C. 154(b) by 810 days.

(21) Appl. No.: 17/010,091

(22) Filed: Sep. 2, 2020

(65) Prior Publication Data

US 2021/0095498 A1  Apr. 1, 2021

(30) Foreign Application Priority Data

Sep. 30, 2019 (JP) .................................. 2019-178287

(51) Int. Cl.
*E05B 79/18* (2014.01)
*E05B 77/36* (2014.01)
(Continued)

(52) U.S. Cl.
CPC .............. *E05B 79/18* (2013.01); *E05B 77/36* (2013.01); *E05B 83/30* (2013.01); *E05C 9/22* (2013.01);
(Continued)

(58) Field of Classification Search
CPC .......... E05B 79/12; E05B 79/14; E05B 79/18; E05B 79/22; E05B 83/28; E05B 83/30; E05B 9/00; E05B 9/002; E05B 9/006; E05B 9/008; E05B 9/04; E05B 9/043; E05B 9/10; E05B 9/16; E05B 9/20; E05B 9/22; E05B 77/36; Y10T 292/0834; Y10T 292/0836; Y10T 292/0838; Y10T 292/0839; Y10T 292/0844; Y10T 292/0845; Y10S 292/11
See application file for complete search history.

(56) References Cited

U.S. PATENT DOCUMENTS 5,911,763 A * 6/1999 Quesada ................... E05C 9/06
                                                    70/108
9,850,692 B2 * 12/2017 Kim ......................... B60R 7/06
(Continued)

FOREIGN PATENT DOCUMENTS

CN         108291412 B  *  6/2020  ............. B60R 7/06
DE     202018100695 U1  *  4/2018  ............. E05B 77/38
(Continued)

OTHER PUBLICATIONS

Japan Patent Office, "Office Action for Japanese Patent Application 2019-178287," May 31, 2022.

*Primary Examiner* — Christine M Mills
*Assistant Examiner* — Peter H Watson
(74) *Attorney, Agent, or Firm* — HAUPTMAN HAM, LLP

(57) ABSTRACT

A lock apparatus includes a lid configured to turn to open and close an opening of a box; a rod switchable between a locked position where a tip of the rod projects to outside of the lid and an unlocked position where the tip is retracted to inside of the lid; and a guide member attached to the inside of the lid and configured to slidably support the rod. The lid includes one of an engaging portion and an engaged portion, and the guide member includes the other of the engaging portion and the engaged portion. The engaging portion and the engaged portion are configured to move the guide member in a direction intersecting a lid opening and closing direction to thereby fix and press-fit to each other without rattle.

2 Claims, 11 Drawing Sheets

(51) Int. Cl.
*E05B 83/30* (2014.01)
*E05C 9/22* (2006.01)
(52) U.S. Cl.
CPC ... *E05Y 2201/686* (2013.01); *E05Y 2600/524* (2013.01); *E05Y 2900/538* (2013.01)

(56) References Cited

U.S. PATENT DOCUMENTS

| | | |
|---|---|---|
| 2009/0102332 A1 | 4/2009 | Lear |
| 2018/0142508 A1* | 5/2018 | Ramirez de Santiago ............... E05F 5/022 |
| 2019/0024415 A1* | 1/2019 | Sakurai ............... E05B 81/06 |
| 2019/0203509 A1 | 7/2019 | Kondo |
| 2019/0234120 A1* | 8/2019 | Flaute ............... B60R 7/06 |
| 2020/0284070 A1* | 9/2020 | Kulicki ............... E05B 63/202 |
| 2022/0161731 A1* | 5/2022 | Tamaki ............... B60R 7/06 |

FOREIGN PATENT DOCUMENTS

| | | | |
|---|---|---|---|
| JP | H04-013773 U | 2/1992 | |
| JP | H10-46896 A | 2/1998 | |
| JP | 2006-104771 A | 4/2006 | |
| JP | 2010-000931 A | 1/2010 | |
| JP | 2013023159 A * | 2/2013 | |
| JP | 2018-040189 A | 3/2018 | |
| WO | WO-2017094551 A1 * | 6/2017 | ............ E05B 13/10 |

* cited by examiner

LOCK APPARATUS FOR LID OF BOX

BACKGROUND

Technical Field

The present invention relates to a lock apparatus that engages and disengages a lid with and from a box, and particularly to a lock apparatus that engages and disengages a lid with and from a box through a pair of rods that is brought away from and close to each other.

Related Art

FIGS. 10A and 10B illustrate a lock apparatus disclosed in JP 2006-104771 A. FIG. 10A illustrates a relationship between the lock apparatus and a lid. FIG. 10B illustrates the lock apparatus. A lock apparatus 20 includes a lid 13 which turns to open and close an opening of a box, a pair of rods (lock arms) 14', 15 each of which is switchable between a locked position where a tip projects to the outside of the lid 13 and an unlocked position where the tip is retracted to the inside of the lid 13, and guide members (slide guides) 22' which are attached to the inside of the lid 13 to slidably support the rods 14', 15. The lock apparatus 20 is engaged with and disengaged from locking recesses on the box through the respective rods 14', 15. Further, each of the guide members 22' is fixed to a boss disposed on the back face side of the lid 13 with a screw (paragraph 0016).

FIGS. 11A and 11B illustrate a lock apparatus disclosed in JP 2018-40189 A. FIG. 11A illustrates a relationship between the lock apparatus and a lid. FIG. 11B illustrates the lock apparatus. Similarly, a lock apparatus 30 includes a lid 3 which turns to open and close an opening of a box 2', a pair of rods 62 each of which is switchable between a locked position where a tip projects to the outside of the lid 3' and an unlocked position where the tip is retracted to the inside of the lid 3', and a guide member 70 which is attached to the inside of the lid 3' to slidably support the rod 62. The lock apparatus 30 is engaged with and disengaged from locking recesses (locking holes) 11, 12 on the box 2' through the respective rods 62. Further, the guide member 70 is fixed to at least either the back face of a front plate 16 or the front face of an outer plate 17, the front plate 16 and the outer plate 17 constituting the lid 3', with a screw inserted into an insertion hole (paragraph 0036). Note that the rod is covered with a knob 36 and thus not illustrated in FIG. 11B.

SUMMARY

The lock apparatuses as described above are suitable for, for example, a glove box mounted on a motor vehicle. The designs required by the lock apparatuses are, in particular, to reduce the number of components and cost, and reduce rattle and unusual noise caused by the rattle even when the lock apparatuses are used for a long period of time. Specifically, in the above lock apparatuses, it is necessary to fix the guide member to the lid with a screw in order to make rattle less likely to occur, which increases the number of components and the number of assembly man-hours. Further, even when the guide member is fixed with a screw, the screw may be loosened by long-term use because the loosening direction of the screw is the same as an opening direction of the lid in opening and closing the lid, which may cause rattle and unusual noise.

It is an object of the present invention to solve the above problems, and particularly to improve the assembly structure of a guide member to reduce a number of man hours and cost and reliably reduce rattle caused by repetitive use and unusual noise caused by the rattle. The other objects will be described in the following description.

In order to achieve the above object, a first aspect of the present invention, specified with reference to the drawings, provides a lock apparatus including a lid configured to turn to open and close an opening of a box; a rod switchable between a locked position where a tip of the rod 6 projects to outside of the lid and an unlocked position where the tip is retracted to inside of the lid; and a guide member attached to the inside of the lid and configured to slidably support the rod. The lid includes one of an engaging portion and an engaged portion, and the guide member includes the other of the engaging portion and the engaged portion. The engaging portion and the engaged portion are configured to move the guide member in a direction intersecting a lid opening and closing direction by fixing and pre-fitting each other without rattle.

Here, "moving the guide member into the direction intersecting the lid opening and closing direction" means moving the guide member in a direction intersecting a turning direction of the lid when the lid is turned to open and close the box. That is, the engaging portion and the engaged portion can be fixed to each other by press-fit by moving the rod from one side to the other side in the lid right-left direction or the lid plate width direction.

The above first aspect of the present invention is more preferably embodied as defined in the following second to sixth aspects.

(1) The engaging portion includes an inclined surface whose height increases as an overlap with the engaged portion increases (second aspect).

(2) The guide member includes: a groove configured to slidingly guide the rod; the engaged portion disposed on one end side in a longitudinal direction of the groove; and a fitted portion disposed on the other end side in the longitudinal direction of the groove. The engaged portion is engaged with the engaging portion disposed on the lid, and the fitted portion is fitted with a fitting portion disposed on the lid (third aspect).

(3) The lid includes one of a locking portion and an elastic claw, and the guide member includes the other of the locking portion and the elastic claw, the locking portion and the elastic claw being engaged with each other. The locking portion and the elastic claw are configured to be engaged with each other by moving the guide member in the direction interesting the lid opening and closing direction (fourth aspect). Here, the "elastic claw" is not limited to a claw disposed on an elastic piece as described below in the exemplary embodiment, and also includes a mode in which a part of a claw is elastically displaced.

(4) The lid includes, inside thereof, a receiving portion configured to support the guide member; a pair of standing walls disposed in a standing manner facing both sides of the receiving portion; and upper walls, each of the upper walls having a substantially L shape, coupled to an upper side of a corresponding one of the standing walls, including a vertical wall, the vertical wall including the engaging portion on an outer face of the vertical wall (fifth aspect).

(5) The lock apparatus further includes a slit disposed between the vertical walls of the upper walls inside the lid. A projection disposed on the guide member is engaged with the slit (sixth aspect).

In the first aspect, as the assembly structure, the guide member is attached to the lid by the press-fit fixation between the engaging portion and the engaged portion.

Thus, it is easy to reduce the number of components, the number of assembly man-hours, and also cost as compared to the known attachment structure with a screw. In addition, in this assembly structure, the engaging portion and the engaged portion can be fixed to each other by press-fit by moving the guide member in the direction intersecting the lid opening and closing direction. Thus, it is possible to eliminate the possibility that the fixing force is relaxed or weakened even when the lid is repeatedly opened and closed as compared to the known attachment structure with a screw. As a result, it is possible to reduce rattle caused by repetitive use and unusual noise caused by the rattle.

In the second aspect, when the engaging portion includes the inclined surface, as assumed from FIGS. 9A and 9B, the engaged portion (the side walls of the exemplary embodiment) is displaced outward while increasing its diameter by the inclined surface of the engaging portion to increase the press-fit degree. As a result, it is possible to more reliably reduce rattle between the guide member and the lid.

In the third aspect, the respective ends in the longitudinal direction of the guide member are restricted with respect to the lid by the press-fit fixation between the engaging portion and the engaged portion and the fitting or insertion between the fitted portion and the fitting portion. Thus, it is possible to stably maintain the assembled state and more reliably reduce rattle.

In the fourth aspect, the lid includes one of the locking portion and the elastic claw, and the guide member includes the other of the locking portion and the elastic claw, the locking portion and the elastic claw being engaged with each other. The locking portion and the elastic claw are elastically engaged with each other together with the press-fit fixation between the engaging portion and the engaged portion. Thus, it is possible to more stably maintain the assembled state of the guide member.

In the fifth aspect, as described below in the exemplary embodiment, the guide member can have a configuration in which the outer diameter part of the guide member is restricted between the standing walls with the engaged portion fixed by press-fit to the engaging portion on the outer face of the vertical wall of the upper wall. Further, the locking portion of the fourth aspect can be disposed on the outer face of the standing wall. Further, the configuration as described in the sixth aspect can be achieved.

In the sixth aspect, as described below in the exemplary embodiment, the projection of the guide member is engaged with the slit of the lid. Thus, both the members are firmly integrated with each other. As a result, rattle is more reliably reduced.

BRIEF DESCRIPTION OF DRAWINGS

FIGS. 5A to 5C are diagrams illustrating the locked state of the left rod, in which FIG. 5A is a front external view, FIG. 5B is a back external view, and FIG. 5C is a schematic external view without a base in a state of FIG. 5B;

FIGS. 6A to 6C are diagrams illustrating the unlocked state of the left rod, in which FIG. 6A is a front external view, FIG. 6B is a schematic external view without the base in a state of FIG. 6A, and FIG. 6C is a back external view;

FIGS. 9A and 9B are diagrams illustrating a modification of the guide member, in which FIG. 9A is a schematic diagram illustrating the relationship between a guide member and a guide member attaching portion, and FIG. 9B is a schematic diagram illustrating a state of the guide member engaged with the attaching portion;

DETAILED DESCRIPTION

Figure 1A:
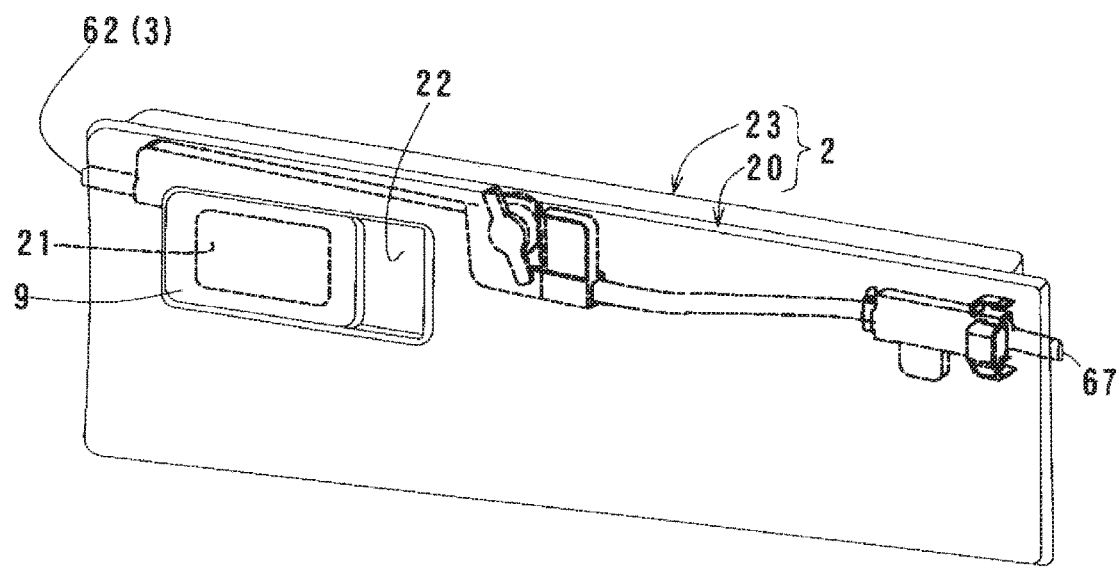
FIG. 1A is a schematic front view of a lid of a box to which a lock apparatus of an embodiment of the present invention is applied.
Figure 1B:
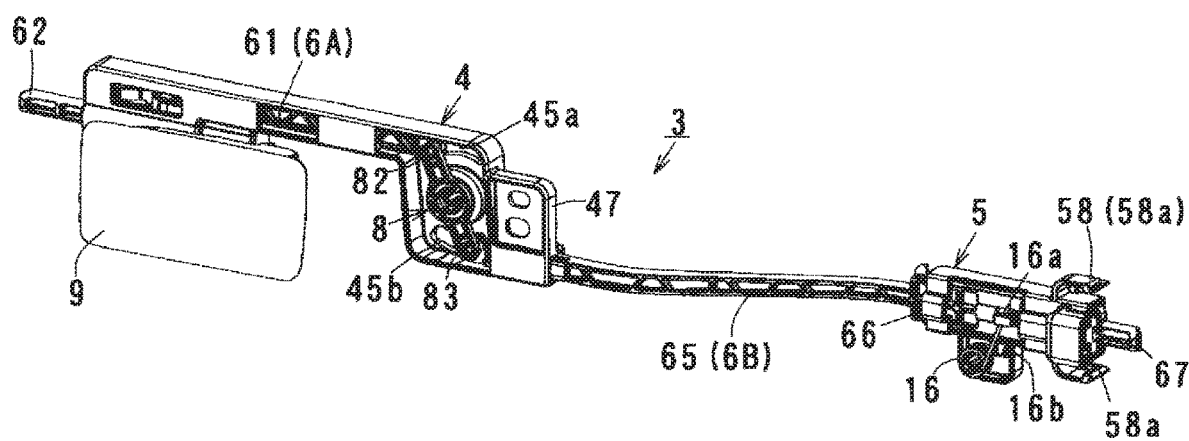
FIG. 1B is a schematic external view of the lock apparatus of FIG. 1A.

Hereinbelow, exemplary embodiments of the present invention will be described with reference to the accompanying drawings. In the following description, the structure of a lock apparatus including a detailed configuration of each member and the relationship between the members is first described, and a principal operation and a modification thereof are then described.

(Structure of Lock Apparatus)

As illustrated in FIGS. 1A to 8B, a lock apparatus 3 of an exemplary embodiment includes: a lid 2 which is a turnable lid, and opens and closes an opening of a box 1; a base 4 which is assembled to the lid 2, located inside the lid 2, and attached to one of the right and left sides of the lid 2; a guide member 5 which is assembled to the lid 2, located inside the lid 2, and attached to the other of the right and left sides of the lid 2; first and second rods 6A, 6B, each of which is slidably supported by the base 4 and the guide member 5 and switchable between a locked position where a tip thereof projects to the outside of the lid 2 and an unlocked position where the tip is retracted to the inside of the lid 2 by a predetermined length; a handle 7 which is turnably supported by a mounting portion 42, the mounting portion 42 being disposed at one end side of the base 4, and moves the first rod 6A between the locked position and the unlocked position in a switching manner; a rotor 8 which is turnably supported by a mounting portion 47, the mounting portion 47 being disposed at the other end side of the base 4, and moves the second rod 6B in conjunction with the first rod 6A; and a knob 9 which is attached to the handle 7 to operate the handle 7.

The knob 9 operates the handle 7 against a biasing force of a coil spring 15. The second rod 6B is biased toward the locked position by a coil spring 16. The first rod 6A is switched between the locked position and the unlocked position in conjunction with the second rod 6B through the rotor 8. Next, details of each of the above members will be described.

(Box and Lid)

Figure 2:
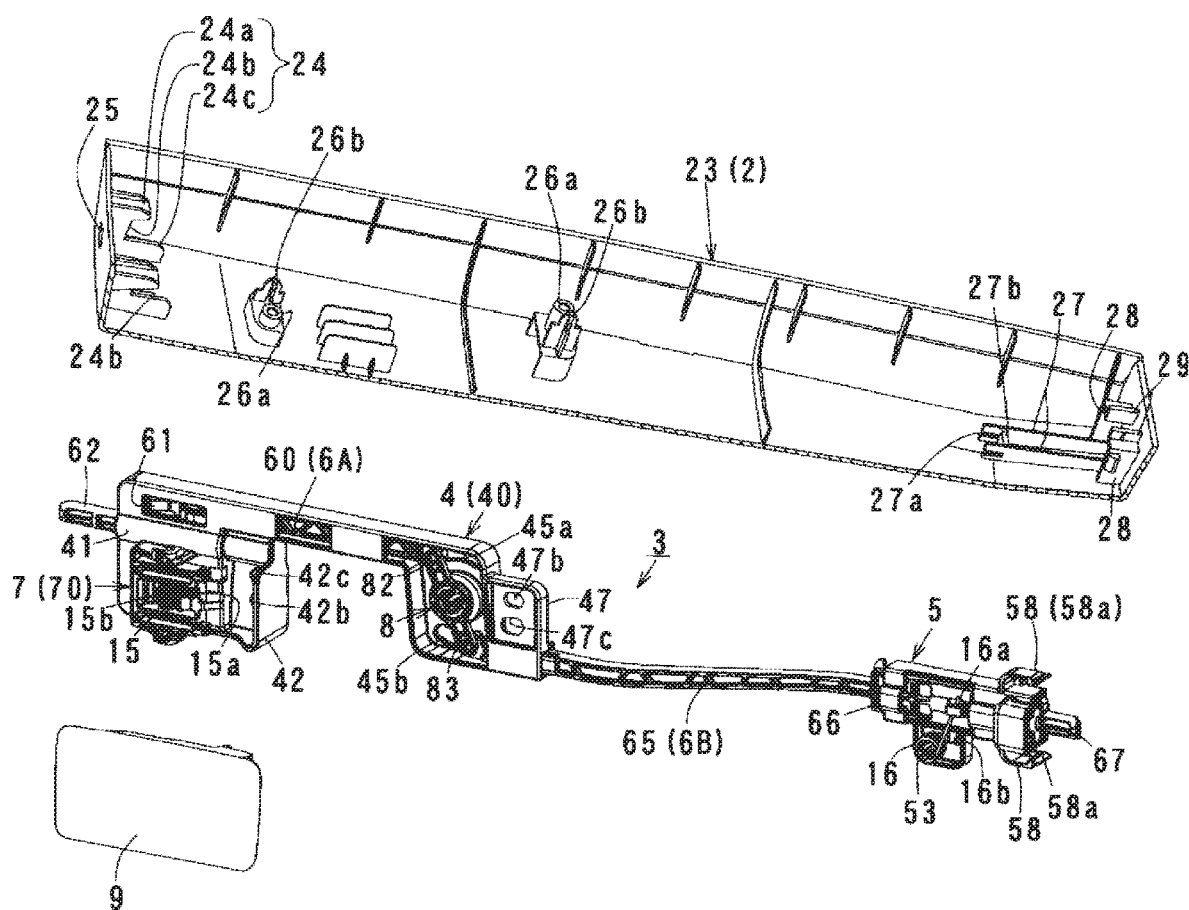
FIG. 2 is a schematic external view illustrating the relationship between the lock apparatus and a lid.
Figure 4A:
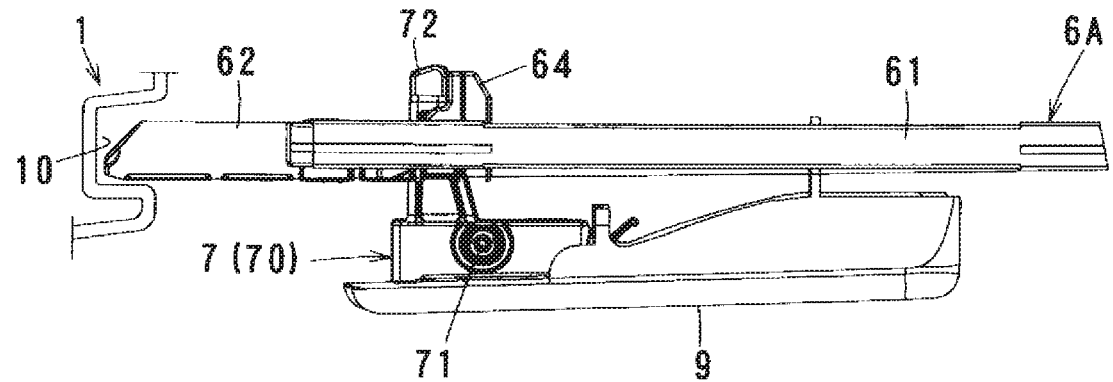
FIGS. 4A and 4B are partial schematic diagrams respectively illustrating a locked state and an unlocked state of a left rod of the lock apparatus.
Figure 4B:
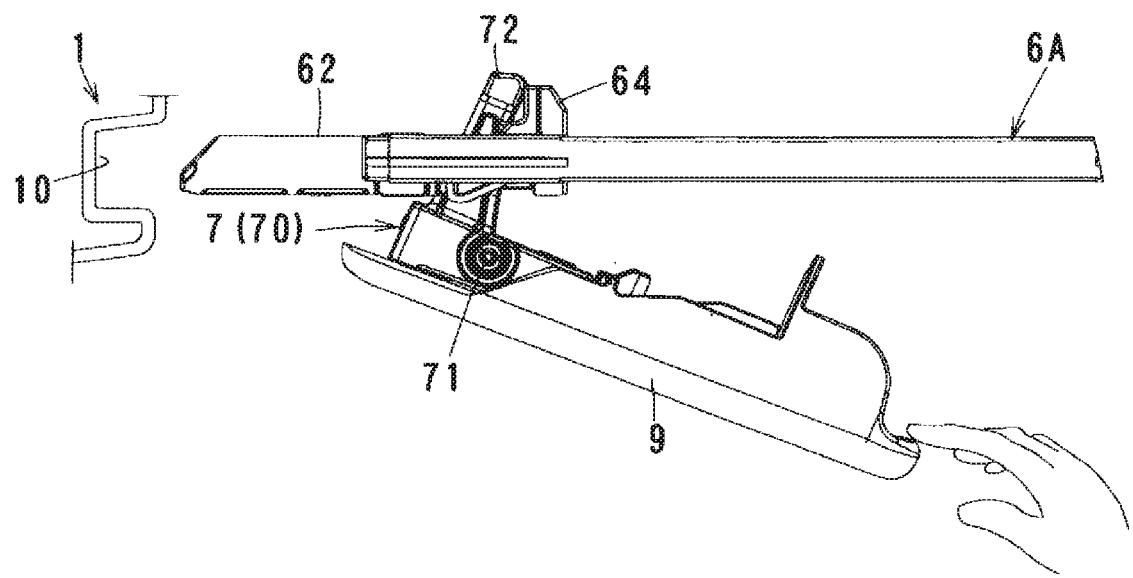

First, the box 1 of FIGS. 4A and 4B assumes a glove box of a motor vehicle. The box 1 includes the opening on the front side corresponding to a vehicle cabin side and locking recesses 10 on right and left side walls. The projecting tips of the first and second rods 6A, 6B are engaged with and disengaged from the locking recesses 10. The opening of the box 1 is opened and closed by the lid 2. The lid 2 includes front and back plates 20, 23 which open and close the opening of the box 1, and the lock apparatus 3 which is disposed between the front and back plates 20, 23. The lid 2 is turnably supported with respect to a side wall of the box 1 through a shaft (not illustrated) or the like. As illustrated in FIG. 1A, the front plate 20 includes a knob hole 21 which is disposed at the vehicle cabin side, that is, the outer side of the box 1 and penetrates the front plate 20 in the front-rear or thickness direction, and a recess 22 for operation which is located on the right side of the knob hole 21 and recessed together with a peripheral part of the knob hole 21. As illustrated in FIG. 2, the base 4 and the guide member 5, which constitute the lock apparatus 3, are attached to a face of the back plate 23, the face facing the front plate 20. The box 1 and the lid 2 have configurations identical or similar to the configurations described in JP 2006-104771 A and JP 2018-40189 A except the back plate 23. Thus, detailed description thereof will be omitted.

More specifically, the back plate 23 includes, on the left inner face side to which the base 4 is attached, a pair of receiving portions 24 which projects from an inner side face toward the inner right side opposite thereto, an insertion hole 25 which is disposed on a left side wall in FIG. 2 and penetrates the back plate 23 between the receiving portions 24, a screw stopper 26a and a clip 26b which receive and fix the mounting portion 42 of the base 4, and a screw stopper 26a and a clip 26b which receive and fix the mounting portion 47 of the base 4. The screw stopper 26a and the clip 26b for the mounting portion 42 are disposed upside down with respect to the screw stopper 26a and the clip 26b for the mounting portion 47. Each of the receiving portions 24 has a substantially U shape, and a corresponding part of the mounting portion 42 is supported in a holding groove 24b which is formed between upper and lower pieces 24a, 24c.

Figure 8A:
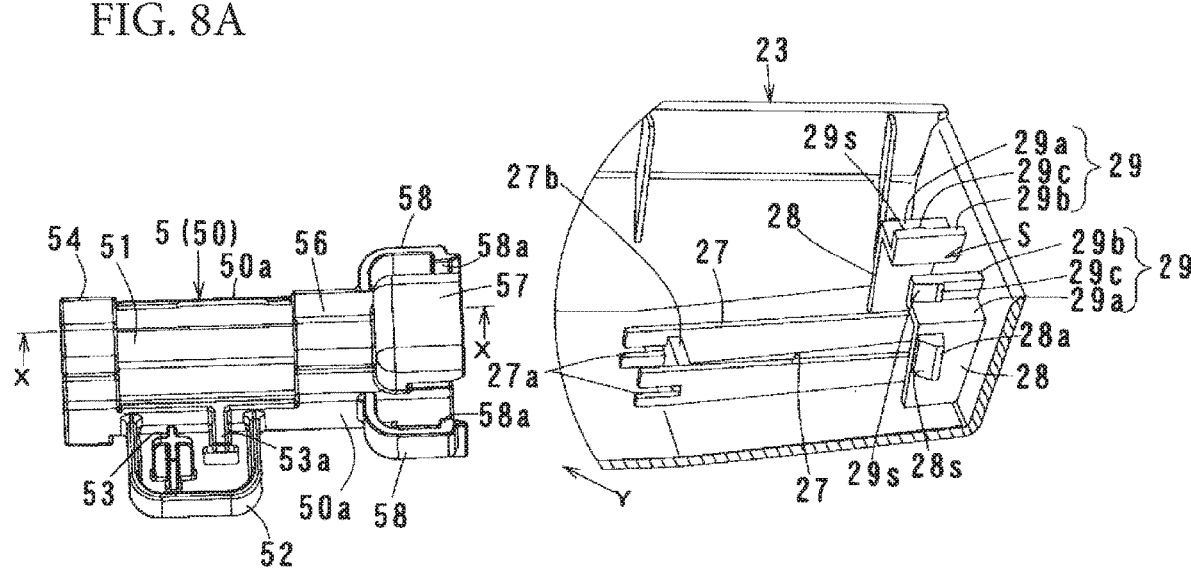
FIG. 8A is a schematic diagram illustrating the relationship between the guide member and a guide member attaching portion.

On the other hand, as illustrated in FIGS. 2 and 8A, the back plate 23 includes, on the right inner face side to which the guide member 5 is attached, a pair of receiving portions 27 which projects from an inner side face toward the inner side opposite thereto, a pair of standing walls 28 which is disposed in a standing manner facing both sides of the receiving portions 27, and upper walls 29 each of which has a substantially L shape and coupled to the upper side of the corresponding one of the standing walls 28. Each of the receiving portions 27 includes a fitting groove 27a as a fitting portion which is disposed on the projecting end in the longitudinal direction of the receiving portion 27. Each of the standing walls 28 is integrated with the base inner side face with a predetermined space from the receiving portion 27, and includes a projection 28a as a locking portion which is disposed on the outer face of the standing wall 28. Each of the projections 28a is disposed at the left edge side in FIG. 8A on the outer face of the standing wall 28, and includes an inclined surface 28s whose height gradually increases toward the right side. A reinforcement plate 27b couples the receiving portions 27 to each other to reinforce the receiving portions 27.

Each of the upper walls 29 includes a horizontal wall 29a which is coupled to the upper end of the standing wall 28, a vertical wall 29b which is coupled to the projecting end of the horizontal wall 29a, and an overhang portion 29c as an engaging portion which is disposed in a projecting manner on the outer face of the vertical wall 29b. The overhang portion 29c is disposed at the left edge side in FIG. 8A on the outer face of the vertical wall 29b, and includes an inclined surface 29s whose height gradually increases toward the right inner face side. Further, a slit S having a predetermined width is defined between the vertical walls 29b of the upper walls 29.

(Rod)

Figure 3:
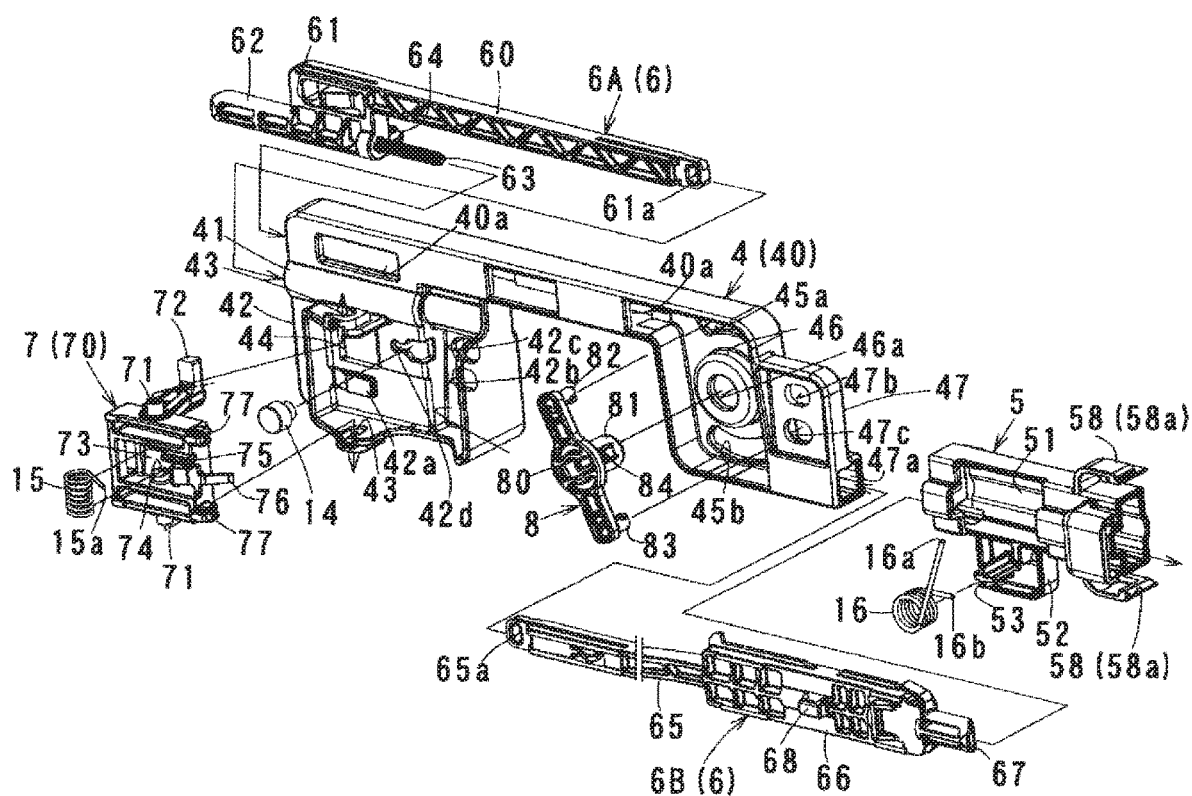
FIG. 3 is an exploded perspective view illustrating the lock apparatus in an exploded manner.

First, as illustrated in FIG. 3, the first rod 6A (6) includes a main body 60 which is disposed on the upper side and has a rod-like shape, a rod tip portion 62 which is integrated with the lower side of one end part of the main body 60, and a shaft 63 which extends coaxially with the rod tip portion 62. The main body 60 includes an elastic claw 61 as a stopper which is disposed on the side face of the main body 60 at one end side thereof, and a fitting hole 61a which is disposed on the rear end thereof. The elastic claw 61 is defined by a U-shaped slit and retractable into the main body 60 by swinging on the base end thereof. The rod tip portion 62 has a substantially columnar shape, and includes a contact portion 64 which is disposed in a projecting manner on a peripheral face of the rod tip portion 62 in front of the shaft 63 and comes into contact with an arm 72 of the handle 7.

As illustrated in FIGS. 2 and 3, the second rod 6B has a rod-like shape longer than the first rod 6A, and includes a narrow portion 65 which is located from the rear end to an intermediate part of the second rod 6B and a wide portion 66 which is located between the narrow portion 65 and a rod tip portion 67. The narrow portion 65 includes a fitting hole 65a which is disposed on the base end thereof. The wide portion 66 includes a locking piece 68 which is disposed on substantially the center in the longitudinal direction thereof. The rod tip portion 67 has a substantially columnar shape.

(Base, Handle, and Rotor)

The base 4 includes a guide portion 40 which has a tubular shape and slidingly guides the main body 60 of the first rod 6A, a lower guide portion 41 which is integrated with a lower part of the guide portion 40 at one end side thereof to slidingly guide the rod tip portion 62 and the shaft 63, the mounting portion 42 which is integrated with a lower part of the lower guide portion 41 to turnably support the handle 7, the mounting portion 47 which is integrated with a lower part of the guide portion 40 at the other end side thereof to support the rotor 8, and an insertion hole 47a which is connected to the mounting portion 47 to receive and guide the base end of the second rod 6B.

Figure 5A:
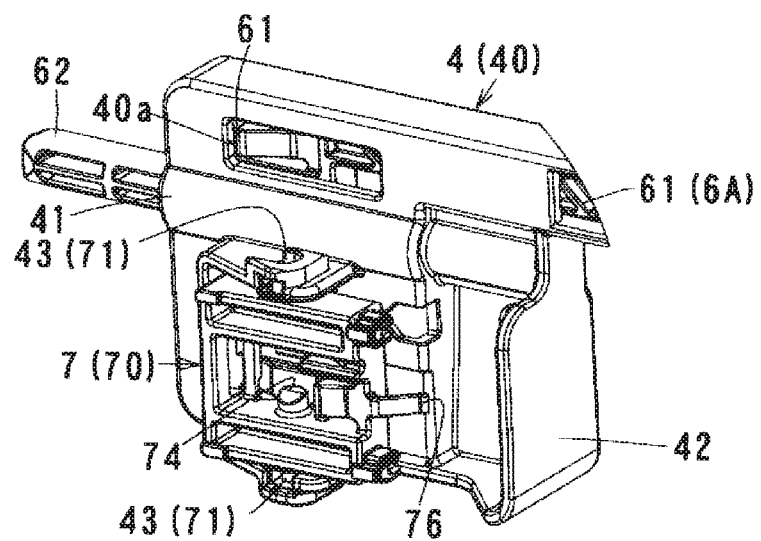
Figure 5B:
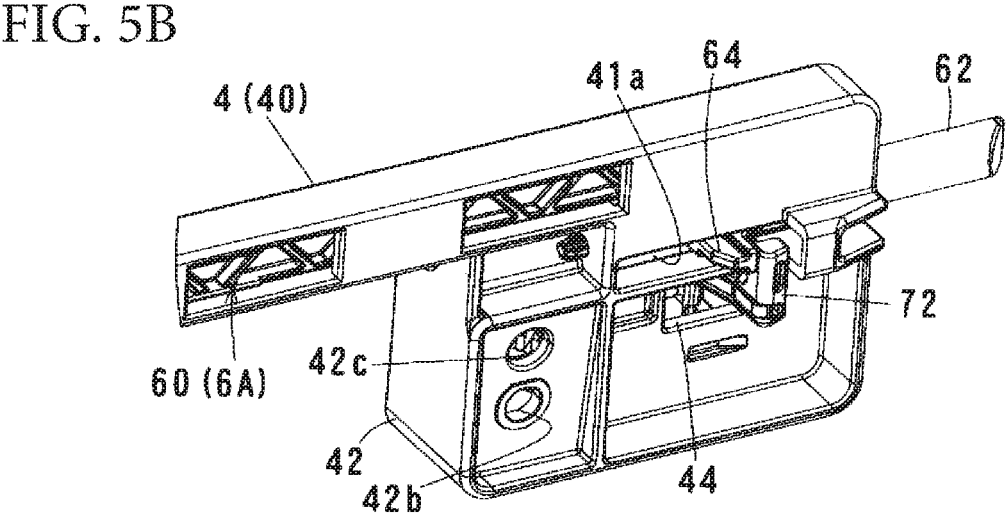

The guide portion 40 and the lower guide portion 41 communicate with each other. The guide portion 40 includes a rectangular opening 40a on the side face thereof. As assumed from FIGS. 5A to 5C, in the process of inserting the main body 60 of the first rod 6A into the guide portion 40, the elastic claw 61 enters the opening 40a while reducing its diameter, and then returns to its original state and comes into contact with the left edge of the opening 40a, which disables the main body 60 to be pulled out of the guide portion 40. In this state, the rear end of the main body 60 projects into a cavity of the mounting portion 47 from the tube of the guide portion 40. The rod tip portion 62 and the shaft 63 are inserted into the lower guide portion 41. At this time, as illustrated in FIG. 5B, the contact portion 64 of the rod tip portion 62 is slidably inserted into a groove 41a which is disposed on the back face side of the lower guide portion 41.

As illustrated in FIG. 3, the mounting portion 42 includes a U-shaped attachment portion which is disposed on the front face side of the mounting portion 42 and includes upper and lower pieces, and attachment holes 43 which are coaxially formed in a penetrating manner on the upper and lower pieces of the U-shaped attachment portion. The mounting portion 42 further includes, inside the U-shaped attachment portion, a window 44 which has a rectangular shape and is disposed at the side corresponding to the upper piece, a base 42a for receiving a spring, the base 42a being disposed on the inner face of the mounting portion 42 under the window 44, and a mounting hole 42d in which a cushion 14 for absorbing shock is mounted. The mounting portion 42 further includes, on the right side relative to the U-shaped attachment portion, an attachment hole 42b which comes into contact with the screw stopper 26a disposed on the back plate 23, and an engagement hole 42c with which the clip 26b is engaged.

On the other hand, the handle 7 supported by the mounting portion 42 includes a main body 70 having a rectangular plate-like shape, shafts 71 which coaxially project from the upper and lower faces of the main body 70, the arm 72 which is disposed in a projecting manner on the upper side of the back face of the main body 70 and inserted into the window 44, a hole 73 which has a substantially rectangular shape and is disposed on the center of the main body 70, a shaft 74 which coaxially projects from upper and lower faces, the upper and lower faces defining the hole 73, the coil spring 15 which is axially supported by the upper and lower shafts 74, a stopper 75 which is disposed on the upper right side of the hole 73 to stop a first end 15a of the coil spring 15, and an elastic piece 76 which is disposed under the stopper 75. The main body 70 includes a knob attaching projection 77 and a latch (not illustrated). The knob 9 is attached by engagement with the projection 77 and the latch to cover the front face of the main body 70. The knob 9 includes a main body coupling portion (not illustrated) on the back face side thereof. As assumed from FIG. 1, the coupling portion is brought close to the main body 70 through the recess 22, which is disposed on the front plate 20, and the knob hole 21, which is disposed on the recess 22, and engaged and integrated with the projection 77 and the latch.

Figure 5C:
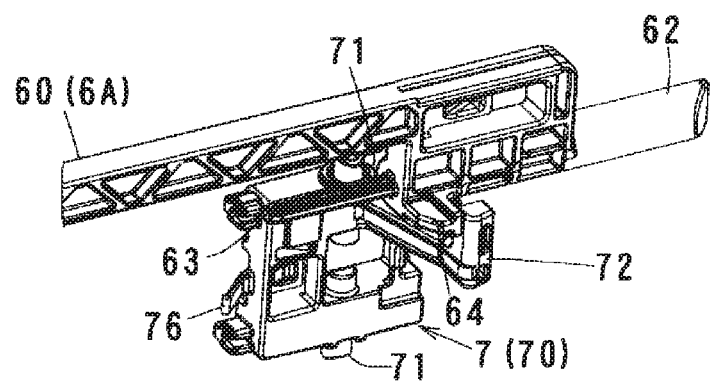
Figure 6A:
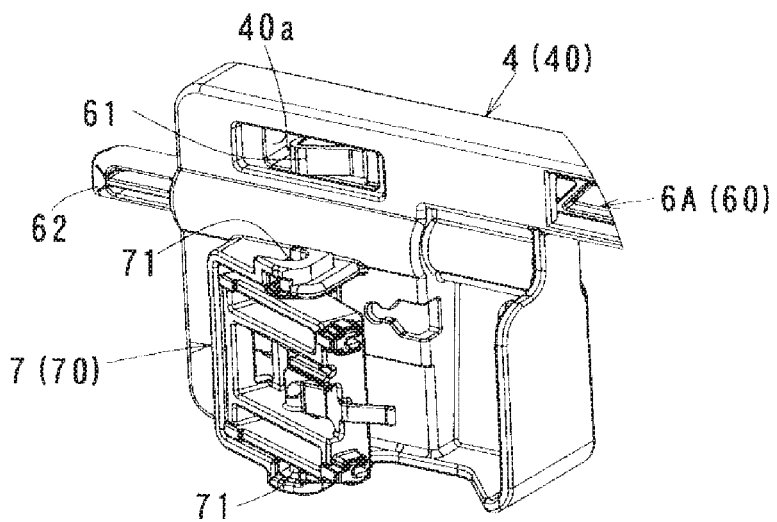
Figure 6B:
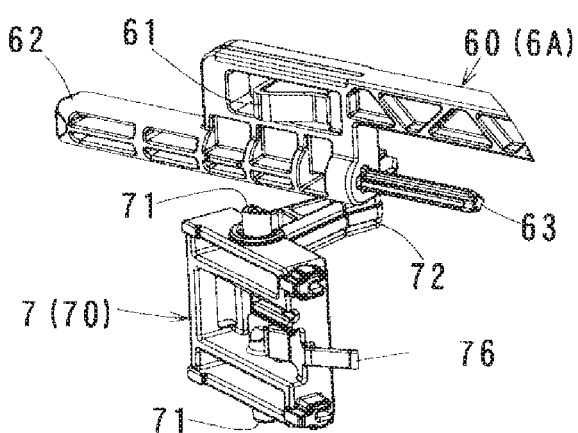
Figure 6C:
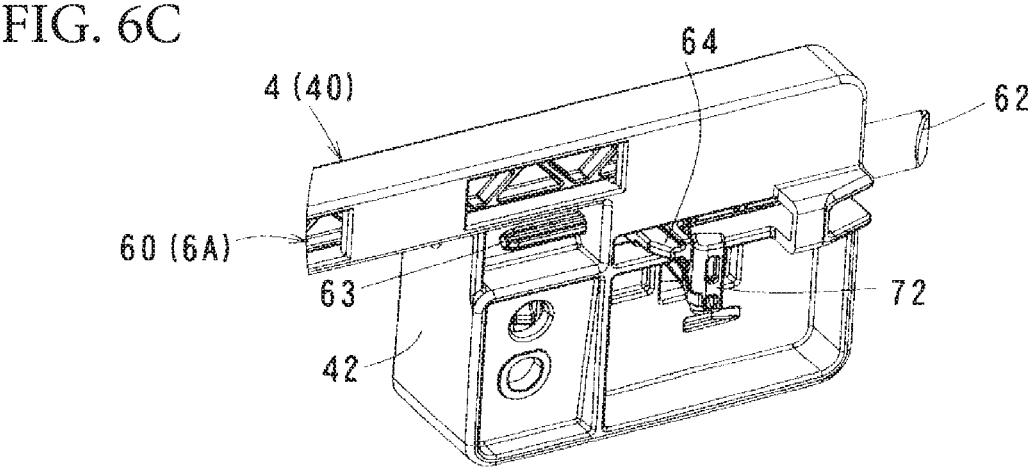

The handle 7 is assembled to the mounting portion 42 turnably by a predetermined angle by fitting the upper and lower shafts 71 with the respective attachment holes 43 with the arm 72 inserted in the window 44. When the first end 15a of the coil spring 15 is locked to the stopper 75 with a second end (not illustrated) of the coil spring 15 locked on the base 42a while the coil spring 15 exhibits a biasing force, the handle 7 is turned in the counterclockwise direction by the biasing force of the coil spring 15 and brought into a normal mode in which the handle 7 is in contact with the inner face of the U-shaped attachment portion as illustrated in FIGS. 5A to 5C. In the normal mode, the arm 72 is in contact with an inner side face defining the window 44, that is, the inner side face located on the end face side of the mounting portion 42 as illustrated in FIG. 5B. Thus, the first rod 6A maintains an engaged state (locked state) in which the rod tip portion 62 projects to the outside to the maximum extent and faces the locking recess 10 on the box 1 until the contact portion 64 comes into contact with the arm 72, which restricts sliding of the first rod 6A as illustrated in FIG. 4A.

In other words, in the assembled state of the lock apparatus 3 described above, the handle 7 is maintained in a state close to the mounting portion 42 or parallel to the mounting portion 42 by the biasing force of the coil spring 15. At this time, the knob 9 is parallel to the recess 22 and is stored inside the recess 22 as illustrated in FIG. 1A. Further, as described below, the first and second rods 6A, 6B are brought into a locked state illustrated in FIG. 4A in which the first and second rods 6A, 6B are separated from each other to the maximum extent through the coil spring 16 and the rotor 8, and the rod tip portions 62, 67 are engaged with the respective locking recesses 10 on the box 1. When the knob 9 is operated with, for example, a hand to turn on the shaft 71 in the clockwise direction against the biasing force of the coil spring 15 as illustrated in FIG. 4B, the arm 72 of the handle 7 moves to push the contact portion 64 in the unlocking direction of the first rod 6A, so that the rod tip portions 62, 67 are detached from the respective locking recesses 10 on the box 1, thereby releasing the lock. On the other hand, as illustrated in FIG. 3, the mounting portion 47 includes a recess having an enough space for receiving the rear ends of the first and second rods 6A, 6B and the rotor 8. The mounting portion 47 includes, inside the recess, a circular receiving base 46 and a pair of restriction grooves 45a, 45b which is opposed to each other around the circular receiving base 46. The receiving base 46 includes a fitting hole 46a on the center thereof. The restriction grooves 45a, 45b have a circular arc shape, and are located on a circle centered on the fitting hole 46a. The mounting portion 47 further includes an insertion hole 47a which is disposed on the outer end face of the recess to introduce the rear end of the narrow portion 65 of the second rod 6B into the recess, an attachment hole 47b which comes into contact with the screw stopper 26a disposed on the back plate 23, and an engagement hole 47c with which the clip 26b is engaged.

The rotor 8 which is supported by the mounting portion 47 has a substantially T shape. The rotor 8 includes a horizontal piece 80, and a tubular portion 81 which is disposed in an intermediate part of the horizontal piece 80. The horizontal piece 80 includes a projection 82 and a projection 83 on the respective ends of the lower face thereof. The tubular portion 81 includes two engagement pieces 84 which are formed and defined around the tubular portion 81 through U-shaped slits. The rotor 8 is turnably assembled inside the mounting portion 47 with the tubular portion 81 undetachably fitted in the fitting hole 46a through the engagement pieces 84. At this time, the projection 82 on one side of the horizontal piece 80 is inserted into the fitting hole 61a of the first rod 6A and then fitted with the restriction groove 45a. The projection 83 on the other side is inserted into the fitting hole 65a on the rear end of the second rod 6B, which is inserted into the insertion hole 47a, and then fitted with the restriction groove 45b. The restriction grooves 45a, 45b restrict a turning range of the rotor 8 by contact of the projections 82, 83 with the inner ends of the restriction grooves 45a, 45b at both sides. Specifically, when the projection 82 comes into contact with the right inner end of the restriction groove 45a, and the projection 83 comes into contact with the left inner end of the restriction groove 45b, the first and second rods 6A, 6B are brought into the unlocked state in which the first and second rods 6A, 6B have been retracted to the maximum extent. On the other hand, when the projection 82 comes into contact with the left inner end of the restriction groove 45a, and the projection 83 comes into contact with the right inner end of the restriction groove 45b, the first and second rods 6A, 6B are brought into the locked state in which the first and second rods 6A, 6B move in the projecting direction to the maximum extent.

In other words, in this structure, for example, the second rod 6B is biased and moved in the projecting direction by the biasing force of the coil spring 16. In synchronization with this, the rotor 8 is turned by a predetermined angle in the counterclockwise direction by the turning restriction of the projection 83 with respect to the restriction groove 45b and the turning restriction of the projection 82 with respect to the restriction groove 45a. In synchronization with this, the first rod 6A is also moved in the projecting direction through the rotor 8. The base 4 described above with the left side of the mounting portion 42 held in the holding groove 24b is fixed at the mounting portion 42 by engagement of the clip 26b on the back plate 23 with the engagement hole 42c and with a screw screwed into the stopper 26a on the back plate 23 through the attachment hole 42b and fixed at the mounting portion 47 by engagement of the clip 26b on the back plate 23 with the engagement hole 47c and with a screw screwed into the stopper 26a on the back plate 23 through the attachment hole 47b.

(Guide Member and Attachment Structure Thereof)

Figure 8B:
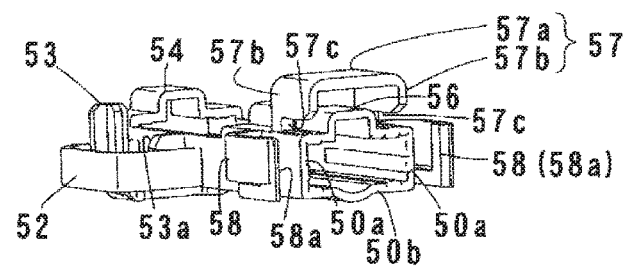
FIG. 8B is an external view of the guide member in a Y direction of FIG. 8A.
Figure 8C:
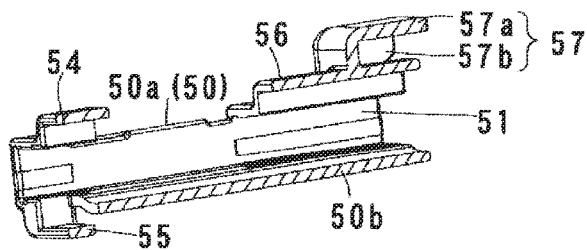
FIG. 8C is a sectional view taken along line X-X of FIG. 8A.

As illustrated in FIGS. 8A to 8C, the guide member 5 includes a main body 50 which has a substantial recessed shape defined by side walls 50a and a bottom wall 50b, and a groove 51 which guides sliding of the wide portion 66 of the second rod 6B inside the guide member 5. The side walls 50a maintain a distance that allows the side walls 50a to be fitted between the standing walls 28. One of the side walls 50a includes a receiving plate 52 which projects in a tongue shape. The receiving plate 52 includes, on the upper face thereof, a shaft 53 which supports the coil spring 16 and a stopper 53a which locks a second end 16b of the coil spring 16.

The main body 50 includes, on one end side thereof, an upper coupling piece 54 which has a projection in a cross section and connects the side walls 50a to each other on the upper side, and a lower coupling piece 55 which has an inverted projection in a cross section and connects the side walls 50a to each other on the lower side. The bottom wall 50b is formed in a recessed shape slightly recessed in a right-left intermediate part thereof so as to be stably supported by the pair of receiving portions 27, and cut away in a part facing the lower coupling piece 55. The lower coupling piece 55 is a fitted portion which is fitted with the fitting grooves 27a as the fitting portion disposed on the receiving portions 27 of the back plate 23.

The main body 50 includes, on the other end side thereof, an upper coupling piece 56 which has a projecting cross section and connects the side walls 50a to each other on the upper side, and a cover portion 57 which is disposed between substantially the right-left center and the other end of the upper coupling piece 56. The upper coupling piece 56 is longer than the upper coupling piece 54. The cover portion 57 is an engaged portion including an upper wall 57a which has a width dimension equal to the width dimension of the upper coupling piece 56 and side walls 57b which maintain spaces from the projection of the upper coupling piece 56. The cover portion 57 is press-fitted to the vertical walls 29b of the upper walls 29. The lower side of each of the side walls 57b is cut away by a predetermined dimension from the other end to maintain a space 57c from the upper coupling piece 56.

In this structure, when the overhang portions 29c of the vertical walls 29b as the engaging portion are press-fitted between the side walls 54b as the engaged portion, each of the side walls 57b is displaceable due to the presence of the space 57c, thereby increasing the press-fit degree to enable press-fit fixation. Further, at this time, the projection of the upper coupling piece 56 is fitted with the slit S between the vertical walls 29b, thereby stably maintaining the press-fit fixation.

The main body 50 further includes, on the other end side thereof, swing pieces 58 which are disposed on the outer faces of the respective side wall 50a. As illustrated in FIG. 8A, each of the swing pieces 58 extends in a substantially L shape from the corresponding side wall 50a of the main body 50 toward the other end side. Each of the swing pieces 58 includes an elastic claw 58a which is disposed on the inner face of the projecting end thereof. In this structure, at the last stage of fixing, by press-fit, the side walls 57b as the engaged portion of the guide member 5 to the overhang portions 29c as the engaging portion on the outer faces of the vertical walls 29b of the upper walls 29, the elastic claws 58a are elastically engaged with the projections 28a of the standing walls 28 as the locking portion. Accordingly, it is possible to more reliably and stably maintain the assembled state of the guide member 5. In addition, in this structure, the inclined surface 28s of the projection 28a gradually increases in height toward the right side, and the elastic claw 58a is displaced in the diameter-reducing direction after passing through the inclined surface 28s. At this time, the elastic claw 58a is engaged with the projection 28a while generating a click sound or a click feeling. Thus, it is possible to sense the completion of engagement.

As described above, the guide member 5 can reliably maintain the fixed state with respect to the back plate 23 at one end side in the longitudinal direction by the fitting between the lower coupling piece 55 as the fitted portion and the fitting grooves 27a as the fitting portion and at the other end side by the press-fit of the overhang portions 29c as the engaging portion to the side walls 57b as the engaged portion, the fitting of the projection of the upper coupling piece 56 with the slit S, and the engagement of the elastic claws 58a with the projections 28a as the engaged portion. Further, each of the overhang portions 29c as the engaging portion includes the inclined surface 29s whose height increases as an overlap with the corresponding side wall 57b as the engaged portion increases. Thus, the side wall 57b is displaced outward while increasing its diameter by the inclined surface 29s to increase the press-fit degree. Accordingly, it is possible to more reliably reduce rattle between the guide member 5 and the back plate 23.

Figure 7A:
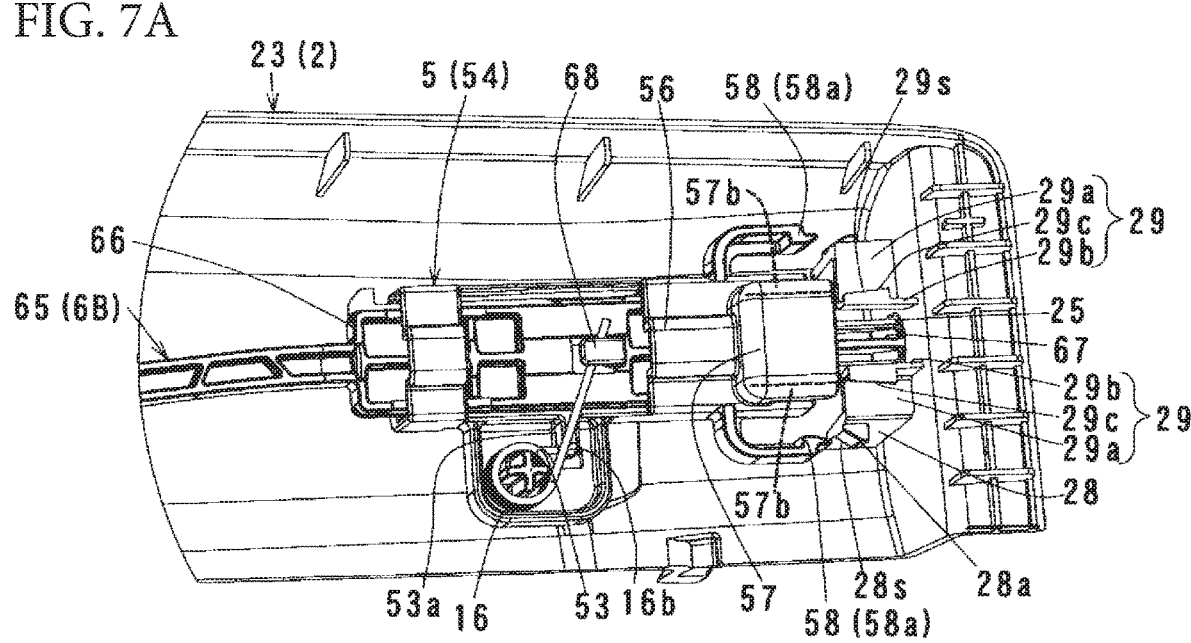
FIG. 7A is a schematic diagram illustrating a state of a guide member of the lock apparatus immediately before the guide member is attached to the lid.
Figure 7B:
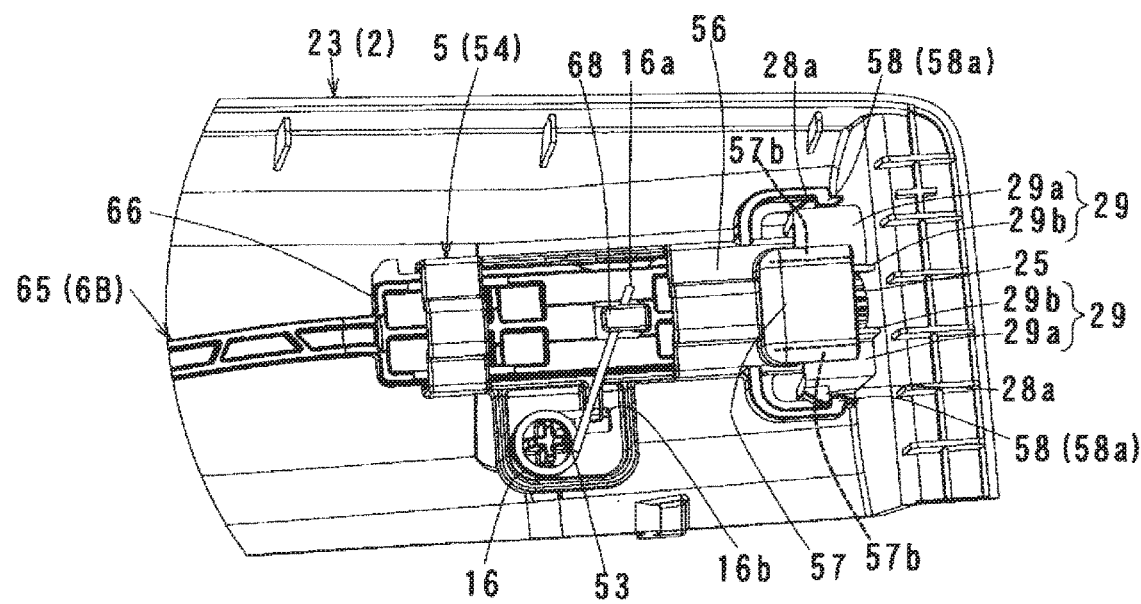
FIG. 7B is a schematic diagram illustrating a state of the guide member attached to the lid.

The second rod 6B is incorporated in the guide member 5 described above with the wide portion 66 fitted with the groove 51. Further, as illustrated in FIG. 7B, the rod tip portion 67 is biased in the projecting direction by the biasing force of the coil spring 16, which is supported by the shaft 53, and moved, in a projecting manner, to the outside to the maximum extent through an insertion hole 25. A first end 16a of the coil spring 16 is locked to the locking piece 68 with the second end 16b locked on the stopper 53a while the coil spring 16 exhibits the biasing force, so that the second rod 6B is moved, in a projecting manner, toward the locked position.

(Operation)

Hereinbelow, principal operation characteristics of the above lock apparatus 3 will be schematically described.

(1) In the lock apparatus 3, the guide member 5 is attached to the lid 2 by the press-fit fixation between the overhang portions 29c as the engaging portion and the side walls 57b of the cover portion 57 as the engaged portion. Thus, the lock apparatus 3 is excellent in that it is easy to reduce the number of components, the number of assembly man-hours, and also cost as compared to the known structure as described in JP 2006-104771 A and JP 2018-40189 A in which the guide member is assembled with a screw. Further, in this assembly structure, the overhang portions 29c and the side walls 57b of the cover portion 57 can be fixed to each other by press-fit by moving the guide member 5 in the lateral direction intersecting the lid opening and closing direction. Thus, it is possible to eliminate the possibility that the fixing force is relaxed or weakened even when the lid 2 is repeatedly opened and closed as compared to the known structure in which fastening is performed with a screw. As a result, it is possible to reduce rattle caused by repetitive use and unusual noise caused by the rattle, thereby improving the quality and reliability. In other words, in this structure, since the guide member 5 is moved in the direction intersecting the lid opening and closing direction, the overhang portions 29c and the side walls 57b of the cover portion 57 as the engaged portion are less likely to be adversely affected by opening and closing of the lid 2.

(2) In addition, in the lock apparatus 3, each of the overhang portions 29c as the engaging portion includes the inclined surface 29s whose height increases as an overlap with the corresponding side wall 57b as the engaged portion increases. Thus, as assumed from FIGS. 9A and 9B, each piece 59a (the side wall 57b in the exemplary embodiment) is displaced outward while increasing its diameter by the inclined surface 29s to increase the press-fit degree. As a result, it is possible to more reliably reduce rattle between the guide member 5 and the lid 2. Further, the respective ends in the longitudinal direction of the guide member 5 are restricted with respect to the lid 2 by the press-fit fixation between the overhang portions 29c and the side walls 57b and the fitting or insertion between the lower coupling piece 55 as the fitted portion and the fitting grooves 27a as the fitting portion. Thus, it is possible to stably maintain the assembled state and more reliably reduce rattle.

(3) In addition, in the lock apparatus 3, the lid 2 and the guide member 5 respectively include the projection 28a as the locking portion and the elastic claw 58a which are engaged with each other. The projection 28a and the elastic claw 58a are elastically engaged with each other together with the press-fit fixation between the overhang portion 29c and the side wall 57b. Thus, it is possible to more stably maintain the assembled state of the guide member 5. Further, as described in the exemplary embodiment, the guide member 5 can have a configuration in which the projection 56 which is the outer diameter part of the guide member 5 is restricted between the standing walls 28 with the side walls 57b as the engaged portion fixed by press-fit to the overhang portions 29c as the engaging portion, and the projection 28a as the locking portion can be disposed on the outer face of each of the standing walls 28. Further, the projection 56 of the guide member 5 is engaged with the slit S of the lid 2. Thus, both the members 2, 5 are firmly integrated with each other. As a result, rattle is more reliably reduced.

(4) FIGS. 1A, 1B, 4A, and 5A to 5C illustrate a state in which each of the first and second rods 6A, 6B of the lock apparatus 3 is located at the locked position, that is, illustrate the locked state. In this locked state, each of the first and second rods 6A, 6B projects to the outside to the maximum extent through the insertion hole 25 through the biasing force of the coil spring 16 and the rotor 8, and each of the rod tip portions 62, 67 is engaged with the locking recess 10 on the box 1 through the insertion hole 25. Further, the first and second rods 6A, 6B are separated from each other to the maximum extent through the rotor 8, and the contact portion 64 of the first rod 6A is in contact with the arm 72 of the handle 7.

(5) FIGS. 4B and 6A to 6C illustrate a state in which each of the first and second rods 6A, 6B of the lock apparatus 3 is located at the unlocked position, that is, illustrate the unlocked state. First, the lock apparatus 3 is switched from the locked state to the unlocked state by operating the knob 9 attached to the handle 7 with, for example, a hand to turn the knob 9 outward on the shaft 71 by a predetermined angle from a horizontal state against the biasing force of the coil spring 15 as illustrated in FIG. 4B. In the switching operation, the arm 72 of the handle 7 pushes and moves the contact portion 64 of the first rod 6A to the left side in FIG. 4B by the turning operation of the knob 9. Accordingly, the first rod 6A is pushed by the arm 72 and moved in the unlocking direction. In synchronization with this, the second rod 6B is retracted through the rotor 8 (the biasing force is accumulated on the coil spring 16 in this process) and moved in the unlocking direction. Then, after the lock apparatus 3 described above is switched to the unlocked state, the second rod 6B is slidingly moved in the projecting direction by the biasing force of the coil spring 16 by releasing the hand from the knob 9 and brought into the locked state again. In synchronization with this, the first rod 6A is slidingly moved in the projecting direction through the rotor 8 and brought into the locked state.

MODIFICATION

Figure 9A:
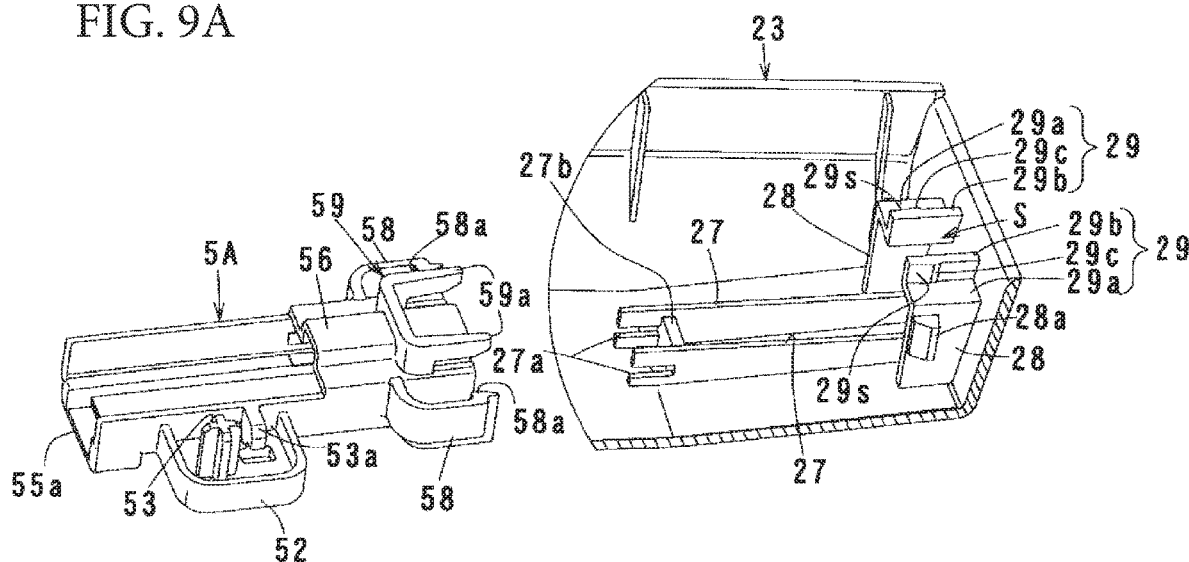
Figure 9B:
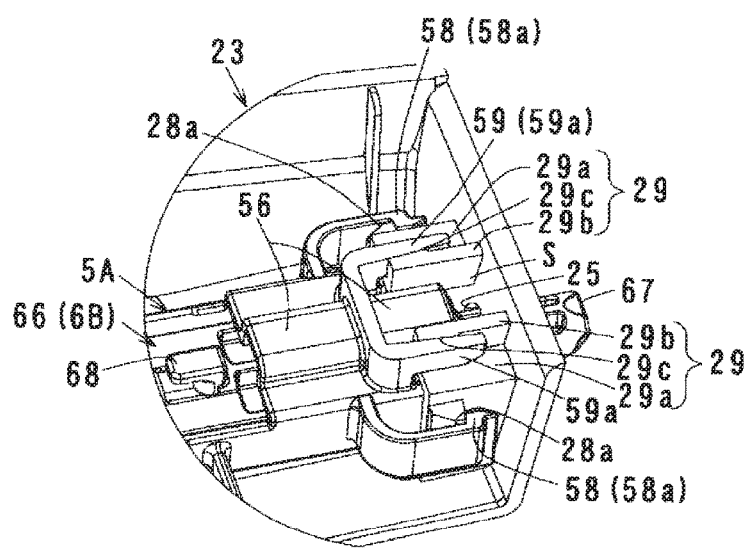
Figure 10A:
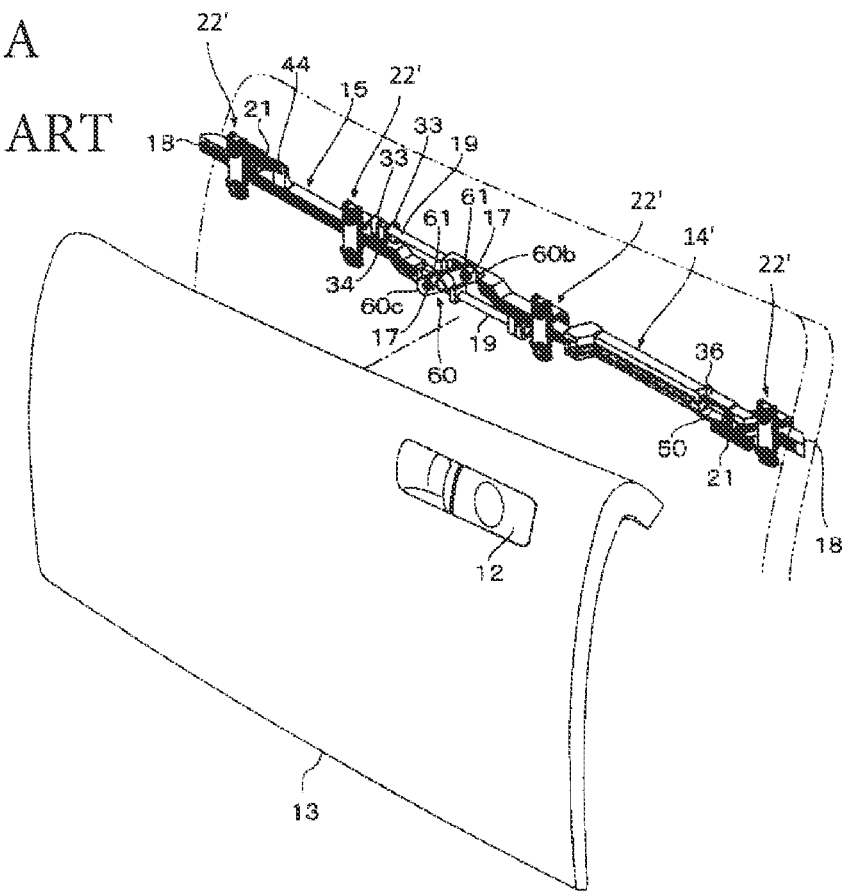
FIGS. 10A and 10B are diagrams illustrating a lock apparatus of JP 2006-104771 A, in which FIG. 10A corresponds to FIG. 3 of JP 2006-104771 A, and FIG. 10B corresponds to FIG. 4 of JP 2006-104771 A.
Figure 10B:
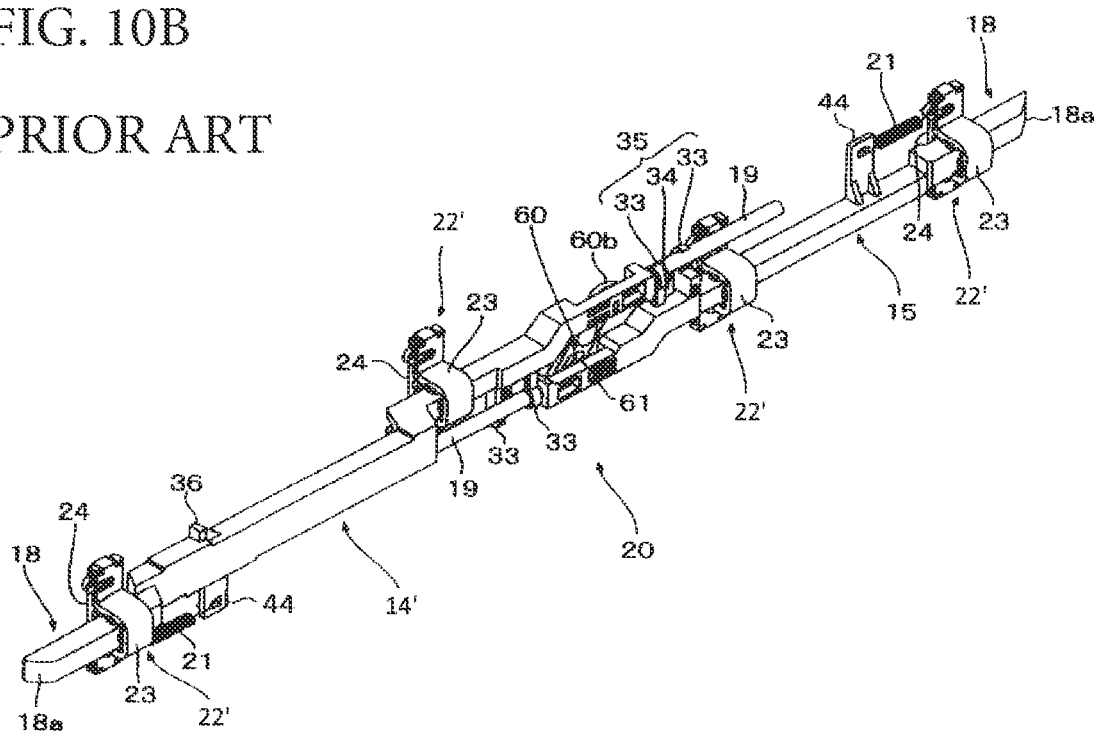
Figure 11A:
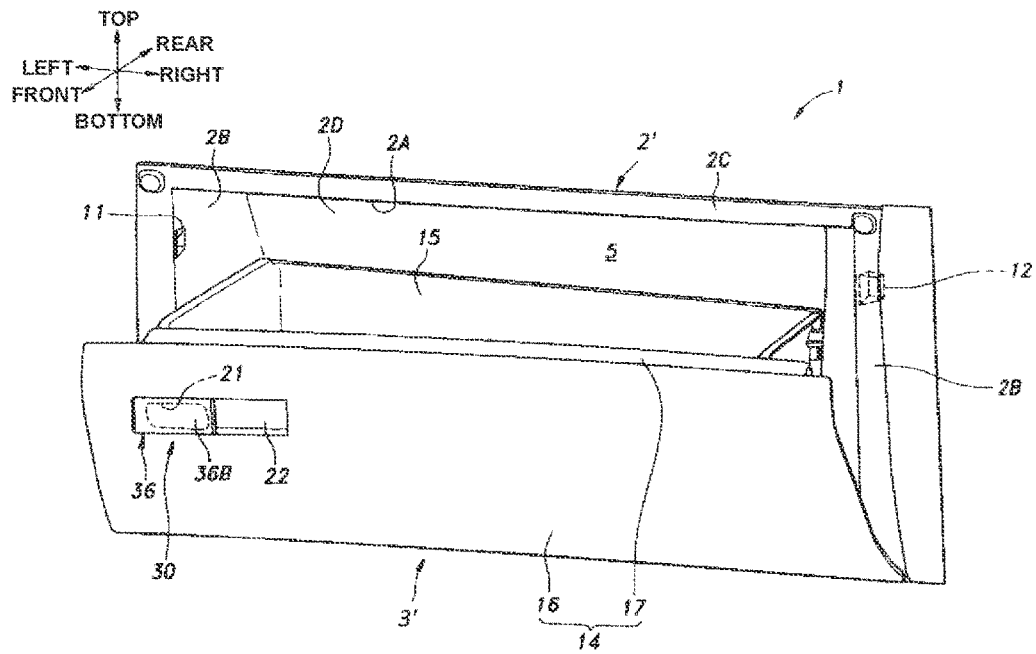
FIGS. 11A and 11B are diagrams illustrating a lock apparatus of JP 2018-40189 A, in which FIG. 11A corresponds to FIG. 1 of JP 2018-40189 A, and FIG. 11B corresponds to FIG. 2 of JP 2018-40189 A.
Figure 11B:
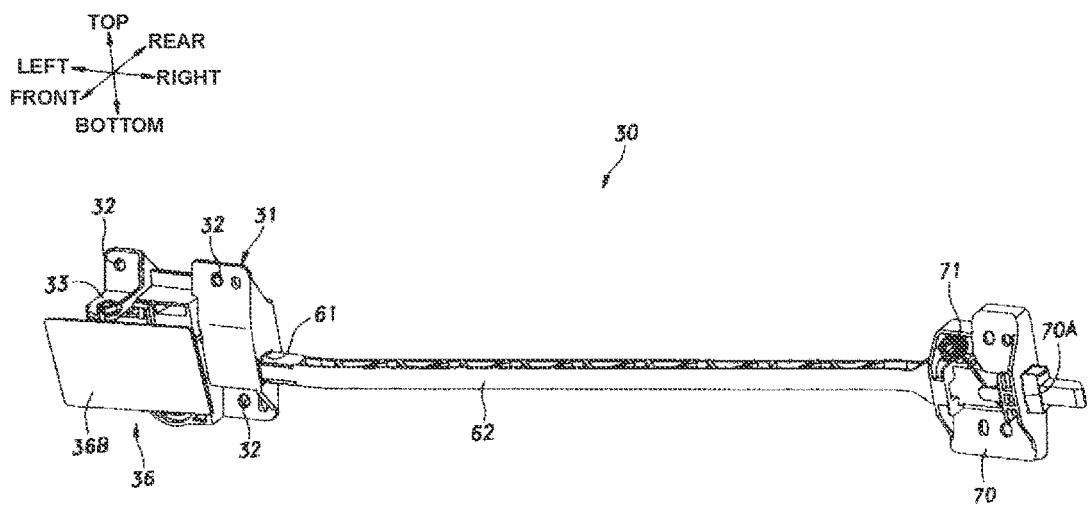

FIGS. 9A and 9B illustrate a modification of the guide member 5. FIG. 9A is a schematic diagram corresponding to FIG. 8A. FIG. 9B is a schematic diagram corresponding to FIG. 7B. A guide member 5A of the modification includes a U-shaped portion 59 corresponding to the cover portion 57 of the guide member 5 described above. The U-shaped portion 59 includes pieces 59a, 59a which are opposed to each other. The pieces 59a, 59a correspond to the side walls 57b as the engaged portion of the above exemplary embodiment. That is, each piece 59a is fixed by press-fit to the overhang portion 29c as the engaging portion disposed on the vertical wall 29b on each side as illustrated in FIG. 9B.

As described above, the lock apparatus 3 of the present invention may include the configurations defined in the claims, and details thereof can be variously modified. For example, as the press-fit fixation structure, the overhang portion 29c may be disposed not on the lid 2 as described in the exemplary embodiment, but on the guide member 5, and the engaged portion 57a may be disposed not on the guide member 5, but on the lid 2. Further, as the engagement structure, the projection 28a may be disposed not on the lid 2 as described in the exemplary embodiment, but on the guide member 5, and the elastic claw 58a may be disposed not on the lid 2, but on the guide member 5.

The present application is based on and claims priority of Japanese Patent Application No. 2019-178287 filed on Sep. 30, 2019, and the disclosure of which is incorporated herein as a reference.

REFERENCE SIGNS LIST 1 box (10: locking recess)
2 lid
3 lock apparatus
4 base
5 guide member
6A first rod (6)
6B second rod (6)
7 handle
8 rotor
9 knob
15 coil spring (15a: first end, 15b: second end)
16 coil spring (16a: first end, 16b: second end)
20 front plate (21: knob hole, 22: recess)

23 back plate (25: insertion hole)
27 receiving portion (27a: fitting groove as fitting portion)
28 standing wall (28a: projection as locking portion)
29 upper wall (29a and 29b: horizontal wall and vertical wall having L shape)
29c overhang portion (engaging portion)
29s inclined surface
50 main body of guide member (50a: side wall, 50b: bottom wall)
51 groove
53 screw support shaft
55 lower coupling piece (fitted portion)
56 projection
58 swing piece (58a: elastic claw)
59 U-shaped portion (59a: piece as engaged portion)
57 cover portion (57a: upper wall, 57b: side wall as engaged portion)
57b side wall (engaged portion)
59 U-shaped portion (59a: piece as engaged portion)

What is claimed is:

1. A lock apparatus comprising:

a lid for opening and closing an opening of a box;

a rod switchable between a locked position where a tip of the rod projects to outside of the lid and an unlocked position where the tip is retracted to inside of the lid; and a guide member formed separately from the lid and the rod, and attached to the inside of the lid, the guide member slidably supporting the rod therein, wherein the lid includes one of an engaging portion and an engaged portion, and the guide member includes an other of the engaging portion and the engaged portion, the engaging portion and the engaged portion engage each other when the guide member is attached to the inside of the lid, the lid includes one of a locking portion and an elastic claw, and the guide member includes an other of the locking portion and the elastic claw, the locking portion and the elastic claw engage with each other when the guide member is attached to the inside of the lid, the lid includes a pair of receiving portions facing each other to which the guide member is slidably attached, a pair of standing walls disposed outside the pair of receiving portions, and a pair of upper walls facing each other and disposed above and integrally formed with the pair of standing walls, and the guide member includes a pair of side walls having a groove therebetween, the pair of side walls engaging the pair of receiving portions, upper and lower coupling pieces formed at one side of the pair of side walls, and another upper coupling piece and a cover portion formed on the other side of the pair of side walls and slidably attached to the pair of standing walls and the pair of upper walls.

2. The lock apparatus according to claim 1, further comprising a coil spring disposed in the guide member and having one end attached to the rod and an other end attached to the guide member to urge the rod in one direction.

* * * * *